United States Patent [19]
Zunquan

[11] Patent Number: 6,041,409
[45] Date of Patent: Mar. 21, 2000

[54] DEVICE AND METHOD FOR DATA INTEGRITY AND AUTHENTICATION

[76] Inventor: Liu Zunquan, 3500 Pennsylvania Ave. #107, Fremont, Calif. 94536

[21] Appl. No.: 09/059,918

[22] Filed: Apr. 14, 1998

Related U.S. Application Data

[63] Continuation of application No. 08/845,803, Apr. 25, 1997, Pat. No. 5,771,292.

[51] Int. Cl.[7] ............................... H04L 9/32; H04L 9/30; H04L 9/00
[52] U.S. Cl. ........................... 713/176; 380/30; 380/255; 380/269; 713/150; 713/168; 713/169; 713/172; 713/189; 713/200; 713/201
[58] Field of Search ................... 380/23, 25, 30, 380/49, 50, 255, 269; 713/200, 201, 150, 168, 169, 170, 171, 172, 173, 174, 175, 189, 176; 395/186, 187.01

[56] References Cited

U.S. PATENT DOCUMENTS

| | | | |
|---|---|---|---|
| 4,924,515 | 5/1990 | Matyas et al. | 380/25 |
| 5,297,206 | 3/1994 | Orton | 380/30 |
| 5,651,069 | 7/1997 | Rogaway | 380/23 X |
| 5,771,292 | 6/1998 | Zunquan | 380/25 |

*Primary Examiner*—Bernarr E. Gregory
*Attorney, Agent, or Firm*—Majestic, Parsons, Siebert & Hsue P.C.

[57] ABSTRACT

Various aspects of data security such as validation, authentication and encryption are accomplished by the combinations of encoding and decoding employing a mapping or inverse mapping controllable by a key k, between a source document x and a transformed document y or a highly compressed transformed document v. In the preferred embodiment, a single mapping module is the basis for an expedient and economic implementation of a unified and comprehensive data security system.

10 Claims, 8 Drawing Sheets

DEVICE AND METHOD FOR DATA INTEGRITY AND AUTHENTICATION

This is a continuation of application Ser. No. 08/845,803, filed Apr. 25, 1997, now U.S. Pat. No. 5,771,292.

FIELD OF INVENTION

This invention relates generally to secure data communication, and more particularly to devices, systems and methods for ensuring data integrity and authenticity controllable by a user-assignable key.

BACKGROUND OF THE INVENTION

Transactions such as commercial, official, and personal ones are increasingly being conducted electronically by means of data exchanged over public telecommunication channels. While the data is in transit or stored in insecure storage, it is vulnerable to unauthorized access, tampering or corruption. Thus its confidentiality and integrity may be compromised. Also, when data received is claimed to originate from a given entity, its authenticity may not be assured. These concerns are particularly acute with the rapid ascendency of the Internet as a popular and global data communication channel, specially when it is well known to be an inherently insecure communication medium.

Thus, secure data considerations includes confidentiality, integrity and authentication.

Data confidentiality is to ensure that the data is only accessible to its intended recipient. It can be accomplished by encryption techniques as disclosed in U.S. Pat. Nos. 5,412,729 and 5,539,827.

Data integrity is to ensure that the retrieved data is identical to the original data. For example, financial institutions such as banks regularly exchange financial data electronically. It is of critical importance that the exchanged data is not corrupted or tampered with, and in the event it is so, that it be easily and quickly detected.

Data authenticity, on the other hand, is to ensure that the retrieved data is truly from the professed owner and not from an imposter. For example, currently the large amount of fraudulently used credit cards demands an expedient and reliable authentication system.

Thus, there is a need for improved data integrity detection and authentication systems.

OBJECTS AND SUMMARY OF THE INVENTION

It is therefore a general object of the present invention to provide devices, systems and methods for data integrity detection and authentication that is highly reliable and yet simple and efficient to execute.

It is another object of the present invention to provide devices, systems and methods for data integrity detection and authentication which are extremely reliable.

It is an object of the present invention to provide devices, systems and methods for data integrity detection and authentication in which the underlying principles are clearly understandable and can be made public without compromising its usefulness and reliability. In this way, the present invention provides a system that can be easily evaluated for its reliability.

It is another object of the present invention to provide devices, systems and methods for data integrity detection and authentication in which the operations thereof is user-controllable.

It is yet another object of the present invention to provide devices, systems and methods for data integrity detection and authentication which are simple to implement and have low computing overheads.

It is yet another object of the present invention to provide integral devices, systems and methods for data integrity detection and authentication which can serve to implement efficient integrity detection, authentication as well as encryption.

These and additional objects are accomplished by the combinations of encoding and decoding employing a mapping or inverse mapping between a source document x and a transformed document y or a highly compressed transformed document v. The mapping or inverse mapping is controllable by a key k. In the preferred embodiment, a single mapping module is the basis for an expedient and economic implementation of a unified and comprehensive data security system that encompasses data validity, authentication and encryption.

A preferred embodiment provides a user-selectable mapping among a vast repertoire of such mappings. The mapping operates on the text of a document which has been partitioned block-by-block. The block size, N, is user-selectable, and each text block is equivalent to an N-dimensional text vector x. The mapping, specified by a set of user-selectable mapping parameters, maps the text vector x to an N-dimensional transformed text vector y. The general principle and form of the mappings in the repertoire can be made public without compromising the security of the method and device. The mappings have the feature that its repertoire has a size that is an exponential function of the block size and the range of each mapping parameter.

In the preferred embodiment, the mapping is in the form:

$$y_t = A\, x_t + z_t$$

where $x_t$ and $y_t$ are respectively N-dimensional text and transformed text vectors corresponding to the tth block;

A is an N×N mapping matrix; and $z_t$ is an N-dimensional second component vector corresponding to the tth block.

A, and $z_t$ constitute the mapping parameters that are part of the confidential key. Essentially, the N×N mapping matrix A defines the mapping space. If each matrix elements are allowed to vary over a range L, then the repertoire of mappings has a size given by permuting all matrix element, viz., $L^{N \times N}$. This is an exponential function and the repertoire size become enormous even for moderate values of N and L. For example, if N=3 and L=100, the repertoire has a mapping population of $10^{18}$.

In the preferred embodiment, a second component $z_t$ is added to make up each transformed text vector in order to enhance the security of the scheme further. This is effective especially against a known-text attack and the potential vulnerability of statistic attack on small block sizes. In one implementation, the second component is a pseudo-random vector which varies from block to block. In another implementation, the second component is a non-linear function or a mixture of non-linear function and a pseudo-random vector.

One important aspect of the present invention is the provision of a mapping framework wherein its size in general and specific mapping property in particular are user-selectable by means of a confidential key. Without the confidential key, others are confronted with a computationally infeasible task of attempting an exhaustive research in the indeterminable repertoire of mappings.

DETAILED DESCRIPTION OF THE PREFERRED EMBODIMENTS

DATA VALIDATION

Figure 1:
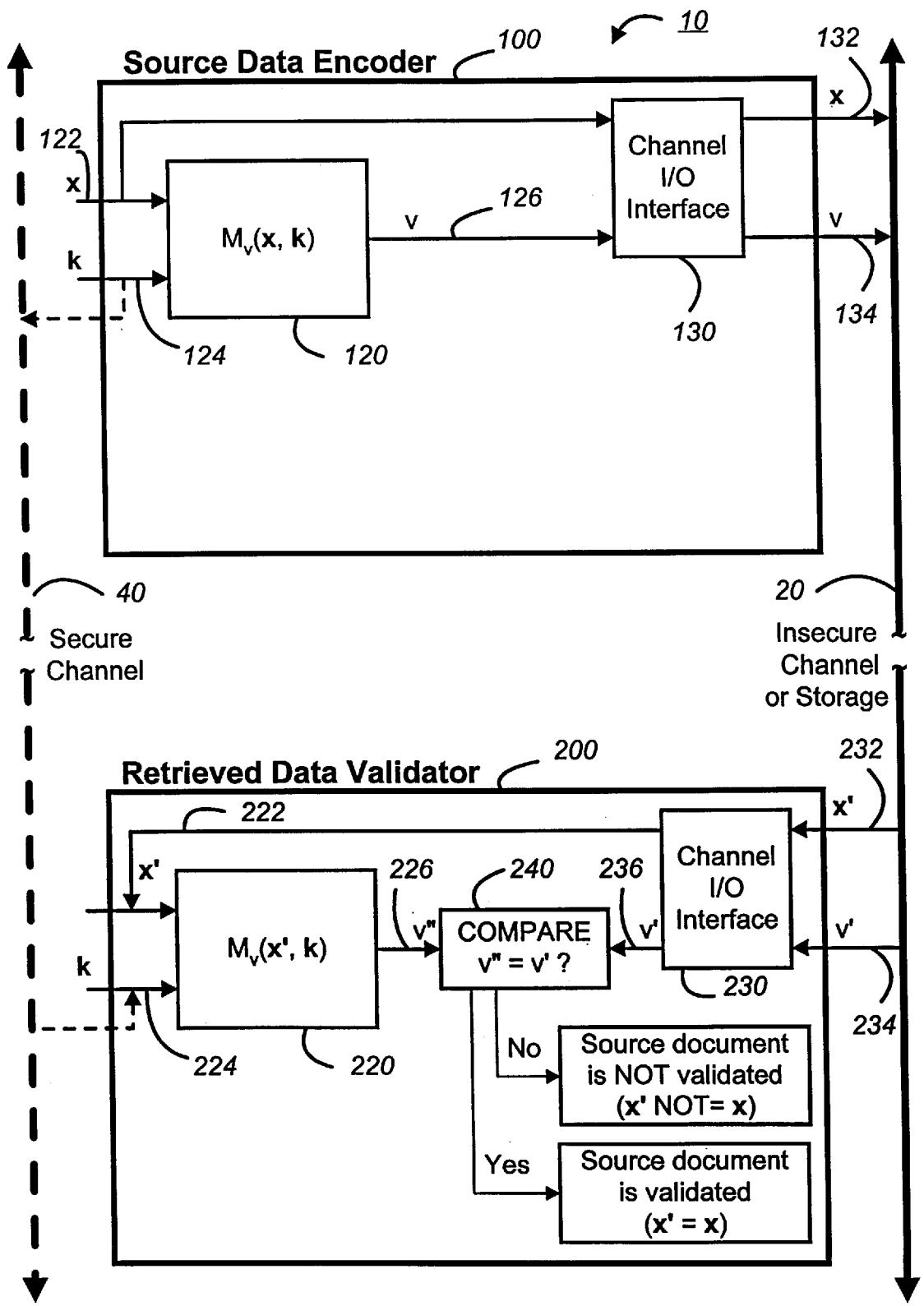
FIG. 1 illustrates schematically a data validation system comprising a source data encoder and a retrieved data validator, according to a preferred embodiment of the present invention.

FIG. 1 illustrates schematically a data validation system according to a preferred embodiment of the present invention. Generally, when a copy of a source document x is retrieved from an insecure channel or storage, there is no assurance that the retrieved document x' is identical to the source document x. The data validation system 10 is applicable to source data which is typically in the form of a source document x that may have been tampered with or corrupted while in transit in an insecure channel or storage 20.

The data validation system 10 comprises a source data encoder 100 and a retrieved data validator 200, both operating under the control of a shared key k. The source data encoder 100 is used to produce a validation code associated with the source document. The retrieved data validator 200 checks, with the aid of the validation code, if the retrieved document is valid.

The source data encoder 100 includes a mapping module 120 that has an input 122 for receiving a source document x to be encoded. It also has another input 124 for receiving a key k. The encoding is performed by the mapping module 120 which effects a mapping $M_v(x, k)$. In the preferred embodiment the mapping $M_v$ is specified by k. Thus, given the key k, the mapping $M_v$ is known. The mapping $M_v(x, k)$ maps the source document x to a validation code v which is therefore also k-dependent. As will be discussed later, the validation code v is preferably a scalar quantity.

The k-dependent validation code v is output from the mapping module 120 via an output 126. The source document x and its associated k-dependent validation code v are made available to the insecure channel or storage via a channel I/O interface 130 through output lines 132 and 134 respectively.

The retrieved data validator 200 retrieves the source document x and its associated validation code v from the insecure channel or storage 20 via a channel I/O interface 230 through input lines 232 and 234 respectively. Since x and v have been in transit through the insecure channel or storage, the retrieved "x" and "v" may not be identical to their originals and will therefore be denoted by x' and v' respectively. The x' and v' data are available via the channel I/O interface 230 from lines 222 and 236 respectively.

In order for the retrieved data validator 200 to validate that the retrieved document x' is indeed identical to the source document x, it must be in possession of the key k that was used to encode x to v. This key k is generally kept confidential and is shared only between the source data encoder 100 and the retrieved data validator 200 via a secure channel 40.

The retrieved data validator 200 has a mapping module 220 similar to the mapping module 120 in the source data encoder 100. The retrieved document x' is received into the mapping module 220 through the input 222. The mapping module also has another input 224 for receiving the same key k that was employed in the source data encoder. Since the key k specifies the mapping $M_v$ to be performed by the mapping module 220, and if the same key k is employed in the source data encoder 100 and the retrieved data validator 200, then both mapping performed in both devices will also be identical.

Thus, the mapping module 220 effects the mapping $M_v(x', k)$ that maps the retrieved document x' to a corresponding validation code v". A comparator 240 compares this validation code v" from the mapping module output line 226 with the validation code v' received from the source data encoder through an input line 236. If the two validation codes are the same (i.e., v"=v'), then one can conclude that the retrieved document is identical to the source document (i.e., x'=x.) If the two validation codes are found not to be the same, then one can conclude that at least one of the three variables: the key k; the retrieved document x'; and the retrieved validation code v' has changed compared to that in the source data encoder 100.

The data validation system 10 is typically used in detecting any unauthorized change in data that has been stored or in transit. For example, when saving a document to magnetic disk storage, a user may select a confidential key for the source data encoder to compute a first validation code to be saved with the document. Subsequently when the document is retrieved, the same key is used for the retrieved data validator to compute from the retrieved document a second validation code. If the two validation codes agree, then the retrieved document is a true copy of the original. If not, the retrieved document has been altered.

Another example is for a first user to transmit a document to a second user via an insecure channel such as the Internet. The first user shares a confidential key with the second user. The first user transmits to the second user the document together with its validation code that has been computed with the key. After the second user has retrieved the document, he or she would compute a validation code for the retrieved document using the same key. The second user will be assured that the retrieved document is a true copy of the one from the first user when the two validation codes agree. If not, the retrieved document has been altered in transit.

In general unauthorized alterations to a document may be caused by inadvertent data corruption owing to hardware defects or by virus attacks or unauthorized tampering. The invention provides a system and method for detecting any such unauthorized alternations. The validation code can not be spoofed since it is computed from the document using a confidential key.

Figure 2A:
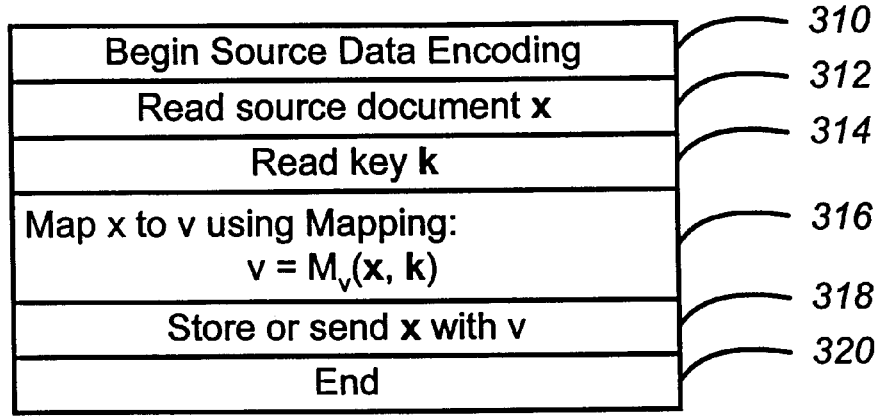
FIG. 2A is a flow diagram of the operation of the source data encoder shown in FIG. 1.

FIG. 2A is a flow diagram of the operation of the source data encoder 100 shown in FIG. 1, which comprises the following steps:

STEP 310: Begin Source Data Encoding

STEP 312: The source document x is read into the mapping module 120 via the input 122.

STEP 314: The key k is read into the mapping module 120 to specify the mapping $M_v(x, k)$.

STEP 316: The source document x is mapped by the mapping $M_v(x, k)$ to the validation code v.

STEP 318: The source document x and its associated key-dependent validation code is stored or transmitted for subsequent retrieval.

STEP 320: End source data encoding.

Figure 2B:
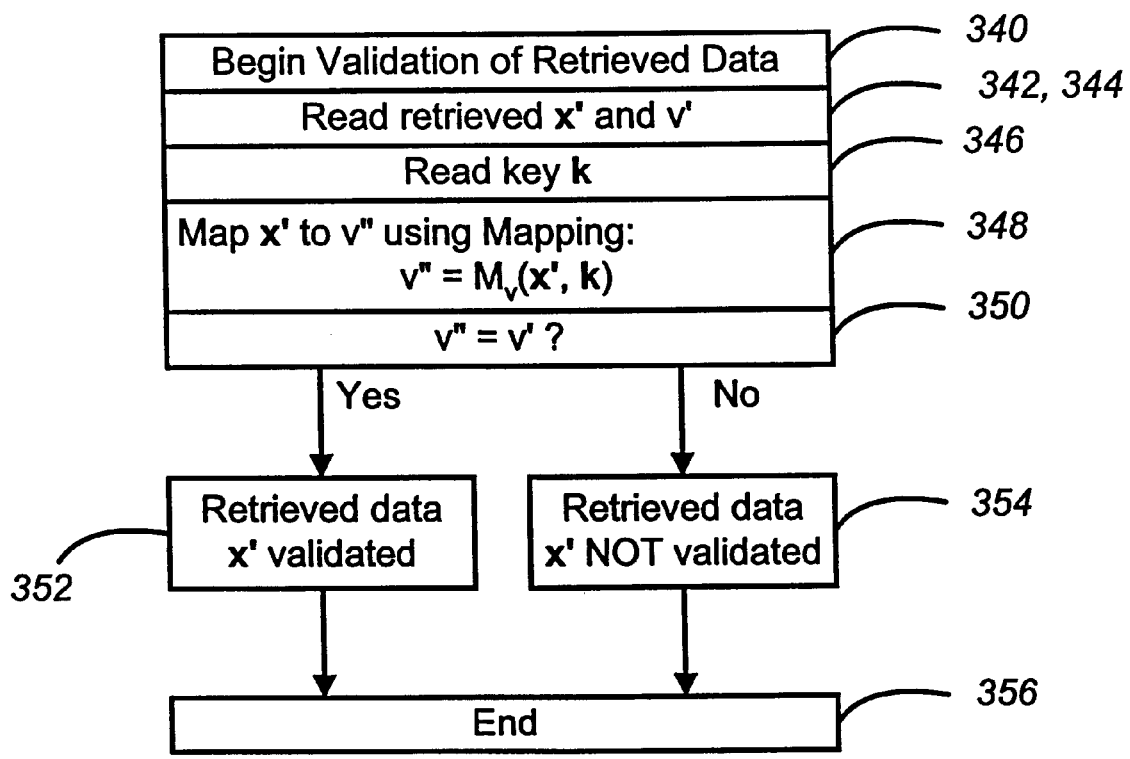
FIG. 2B is a flow diagram of the operation of the retrieved data validator shown in FIG. 1.

FIG. 2B is a flow diagram of the operation of the retrieved data validator 200 shown in FIG. 1, which comprises the following steps:

STEP 340: Begin validation of retrieved data.

STEP 342: The retrieved document x' is read into the channel I/O interface 230 via the input 232 and then passed onto the mapping module 220.

STEP 344: The retrieved validation code v' is read into the channel I/O interface 230 via the input 234.

STEP 346: The key k is read into the mapping module 220 to specify the mapping $M_v(x', k)$.

STEP 348: The retrieved document x' is mapped by the mapping $M_v(x', k)$ to the validation code v".

STEP 350: The validation codes v" and v' are compared. If v"=v', the operation proceeds to Step 352. If not, the operation proceeds to Step 354.

STEP 352: The result of the comparison indicates the retrieved document is a true copy of the source document. The operation proceeds to Step 354.

STEP 354: The result of the comparison indicates the retrieved document is not a true copy of the source document. The operation proceeds to Step 354.

STEP 356: End validation of retrieved data.

MAPPING SCHEME

The preferred mapping scheme of the mapping module such as 120, 220 includes the following steps:

Step I. Select Block Size N

The document x is partitioned into blocks. Each block corresponds to an N-dimensional text vector. Each N-dimensional text vector is mappable to an N-dimensional transformed text vector. Thus $$\text{Text } x=x_i=[x_1, x_2, \ldots, x_N]$$

$$\text{Transformed text } y=y_i=[y_1, y_2, \ldots, y_N] \quad (1)$$

$$i=1, 2, \ldots, N$$

The original text is usually in the form a character stream. This character representation can be converted to a numerical one by means of a predefined character code table. The $x_i$'s and $y_i$'s are coded in numerical representation.

In general, $x_1, x_2, \ldots, x_N$ do not necessarily correspond to the same order the elements in the text character stream come in. Optionally, an initial block permutation prior to mapping can be used to shuffle the initial ordering of the block elements. The initial block permutation can be specified as part of the mapping information to be passed by means of the confidential key.

Step II. Generate mapping for tth block $$y_t = A \, x_t + z_t \quad (2)$$

by specifying a set of mapping parameters: $A, z_t, \ldots$ where t is a label for the tth block or vector, A is in general an invertible N×N mapping matrix $$A = a_{ij} = \begin{bmatrix} a_{11} & a_{12} & \ldots & a_{1N} \\ a_{21} & a_{22} & \ldots & a_{2N} \\ \vdots & \vdots & & \vdots \\ a_{N1} & a_{N2} & \ldots & a_{NN} \end{bmatrix} \quad i, j = 1, 2, \ldots, N \quad (3)$$

and $$z_t = (z_i)_t = [z_1, z_2, \ldots, z_N]_t \quad (4)$$

is a second vector component that can assume different forms depending on embodiments. As will be described in more detail later, in one embodiment it is equal to zero. In another embodiment, it is a random vector that varies block-by-block. For example, $$(z_i)_t = b_i R(t, c_i) \quad (5)$$

where $R(t, c_i)$ is a pseudo-random function at t $b_i$ is a constant vector, e.g., $b=[b_1, b_2, \ldots, b_N]$ $c_i$ is an initial value of R.

In yet another embodiment, $(z_i)_t$ may also be a nonlinear function of $x_i$.

Step III. Share a key between entities for passing mapping information from a source entity to a retrieving entity. For example, k=[Block size; Mapping parameters, Random function specifications; initial block permutation, . . . ]

$$= [N; A; z_t, \ldots; \ldots] \quad (6)$$

In general the key k allows a set of mapping parameters to be derived for controlling the mapping effected by the mapping module. The key space {k} includes the set of all possible keys that are generated by all possible values of each key parameters within its range. For example, if each mapping matrix element has a range with L possible values, such as $$\{L\} = \{0, 1, 2, \ldots, L-1\}$$

$$a_{ij} \in \{L\}$$

Then, given N, the set of possible keys residing in a key space is given by:

$$\{k\} \approx L^{N \times N} \quad (7)$$

The mapping is preferably carried out with integer quantities to avoid truncation problems. Thus, all the mapping parameters as well as the text representation are given in integers and computations are exact.

In some applications where enhanced security is desired, the second vector component $z_t$ is non-zero. It is added to make up each transformed text vector in order to further enhance security, especially against a known-text attack and the potential vulnerability of statistic attack on small block sizes.

In one preferred implementation, the second vector component is a pseudo-random vector that varies from block to block. For the tth block, by Equation (2), each transformed text vector element is given by $$y_1 = a_{11}x_1 + a_{12}x_2 +, \ldots, a_{1n}x_N + b_1 R(t,c_1)$$
$$y_2 = a_{21}x_1 + a_{22}x_2 +, \ldots, a_{2n}x_N + b_2 R(t,c_2)$$
.
.
.
$$y_N + a_{N1}x_1 + a_{N2}x_2 +, \ldots, a_{NN}x_N + b_N R(t,c_N) \qquad (9)$$

The key has parameters $$k = [N; a_{ij}; b_i; c_i; \ldots] \qquad (10)$$

MAPPING MODULE

Figure 3:
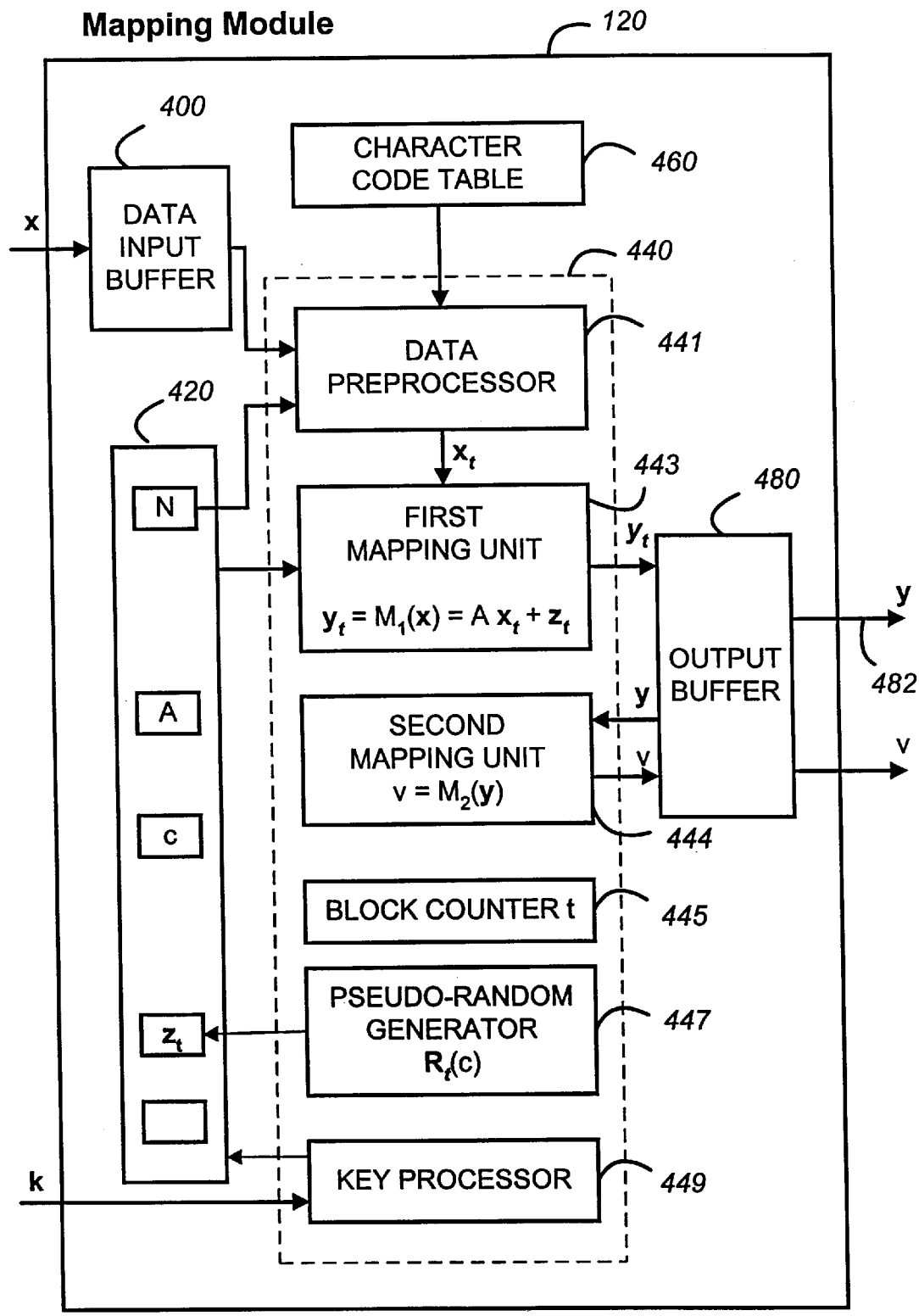
FIG. 3 illustrates a functional block diagram of the mapping module used by security devices such as the source data encoder and the retrieved data validator, according to a preferred embodiment of the present invention.

FIG. 3 is a functional block diagram of the mapping module according to a preferred embodiment of the present invention. The mapping module 120 essentially comprises a text input buffer 400 for receiving input text, a storage 420, a processor 440, a character code table 460, and a transformed text output buffer 480.

The storage 420 is used to store, among other things, controlling parameters for controlling the encryption. Examples of such controlling parameters are N, A, $z_t$, ... As described above, N is the block size, A is the N×N mapping matrix, and $z_t$ is a vector that forms the second component of the transformed text vector $y_t$. There may be other parameters for controlling $z_t$, such as $z_{t=zt}(b,c)$ where b is an N-dimensional constant vector and c is an initial value vector for input into a pseudo-random generator.

The processor 440 includes several functions which are illustrated as functional blocks, such as a text pre-processor 441, a first mapping unit 443, a second mapping unit 444, a block counter 445, a pseudo-random generator 447, and a key processor 449.

In operation, a key k is first processed by the key processor 449 to obtain the controlling parameters such as N, A, $z_t(b,c)$ which are then stored in storage 420. Preferably, the key processor also checks whether or not the input key is valid against a stored set of key validation rules. If the input key is found to be invalid, a message is communicated out of the device to notify the user as to what the problem is. In one implementation, the key k comprises a concatenation of the controlling parameters and the key processor 449 parses them out before they are stored in storage 420. In another implementation, the key k comprises a reduced input set compared to that required for the set of controlling parameters. The key processor 449 also serves as a key generator which expands the reduced input set to the full set of controlling parameters that are eventually stored in storage 420. For example, if a key space of $2^{256}$ is desired, the key is 256 bits' long and can be mapped by a predetermined key mapping onto the full set of controlling parameters. Once the controlling parameters are in place, they can be accessed by the processor 440.

Input text in the form of a character stream entering the mapping module 120 is buffered by the text input buffer 420 before being processed by the text pre-processor 441.

The text pre-processor 441 parses out the input text character stream block-by-block of size N in accordance with the block size parameter from storage 420. In one implementation, the text pre-processor also performs an initial block permutation in response to parameters in the storage 420. A character code table 460 is used to convert each character into a numerical value such that each block is equivalent to a text vector x. The character code table may optionally be located outside the mapping module 120.

The block counter 445 keeps track of which block is being processed. Thus, the tth block produces the text vector $x_t$.

The first mapping unit 443 receives the text vector $x_t$ to compute a corresponding transformed text vector $y_t$. A first mapping $M_1(x)$ is employed to map into the transformed text vector $y_t$. The mapping M is specifiable by the key k. In the preferred embodiment, the transformed text vector $y_t$ is obtained by operating an N×N matrix A on $x_t$ and adding a second component $z_t$ to it. The matrix A and the second component are obtainable from storage 420.

In the preferred embodiment, the second component is a randomizing component which varies block-by-block. A pseudo-random generator $R_t(c)$ 447 provides a series of pseudo-random vectors, one for each block. Each series is dependent on the initial value vector c. For the tth block, $z_t$ assumes the tth pseudo-random vector in the series.

In this way the transformed text vectors are computed by the first mapping unit 443 which are then output from the mapping module 120 via the output buffer 480 and the output line 482 as transformed text y.

In general, the first mapping unit and the transformed text vectors constitute part of a comprehensive security device that include the functionalities of encryption as well as validation and authentication disclosed herein. The encryption portion of it is disclosed in U.S. Pat. No. 5,412,729, the entire disclosure thereof is incorporated herein by reference.

As described above, a document x is inputted into the mapping module 120. It is then preprocessed and reconstituted into a series of text vectors $x_t$ which are mapped by the mapping module 440 into a corresponding series of transformed text vectors $y_t$. The series of transformed text vectors constitutes the transformed document y which is buffered by the output buffer 480.

Since the mapping from the original document x to the transformed document y is specified by a confidential key k, the transformed document y can be regarded as a securely coded version of the original document x. In one embodiment, the transformed document y serves as the validation code v as described earlier in connection with data validation.

The second mapping unit 444 is employed, in a preferred embodiment, to map the transformed document y into a compressed validation code v. Depending of the amount of compression desired, in one implementation, the compression is moderate and lossless. In another implementation, the compression is lossy. In the preferred implementation, the compressed validation code is a scalar quantity. The compression greatly reduces the information content of the validation code v and is advantageous in two respects. First, the bandwidth and storage requirement for the validation code v is greatly reduced. Secondly, in the case of high and lossy compression, it will be virtually impossible for an attacker to determine the relation between the original document x and it key dependent validation code v.

As shown in FIG. 3, the second mapping unit 444 receives the first transformed text y from the output buffer 480 and employs a mapping $M_2(y)$ to map y into v. The second mapping $M_2$ is optionally specifiable by the key k, similar to the first mapping $M_1$. In one preferred embodiment, $M_2$ is such that the validation code is obtained by $$v = ABS(\text{Sum over } y_i)$$

As mentioned earlier, an important feature of the invention is to obtain the validation code by subjecting it to a mapping that is relatively uniform in the sense that there are no singularities in which a number of selected x's are likely to all map to the same y. In the preferred embodiment, this is accomplished by a first mapping followed by a second mapping. The first mapping is a uniform and preferably reversible mapping in N-dimensional space in which an N-dimensional vector is mapped into another N-dimensional transformed vector in the same space. The transformed vector is then subjected to the second mapping in which a high compression can take place without unduly mapping all vectors into a small set of singularities. In this way, the probability of two texts having the same validation code is greatly reduced. For example, the validation code can be obtained by retaining only the magnitude information of the transformed vector, and only the set of text vectors that maps to the set of transformed vectors lying on the surface of spherical subspace with have similar validation codes.

The present invention also contemplates a computer under software control for implementing the various functions performed by the mapping module 120. For example, the processors 440 can be assumed by the microprocessor of a general computer. The storage 420, and buffers 400, 480 can be assumed by the various types of storage in the computer. A software can reside in one of the storage of the computer for controlling the mapping operations in accordance with the method described above.

AUTHENTICATION

Figure 4:
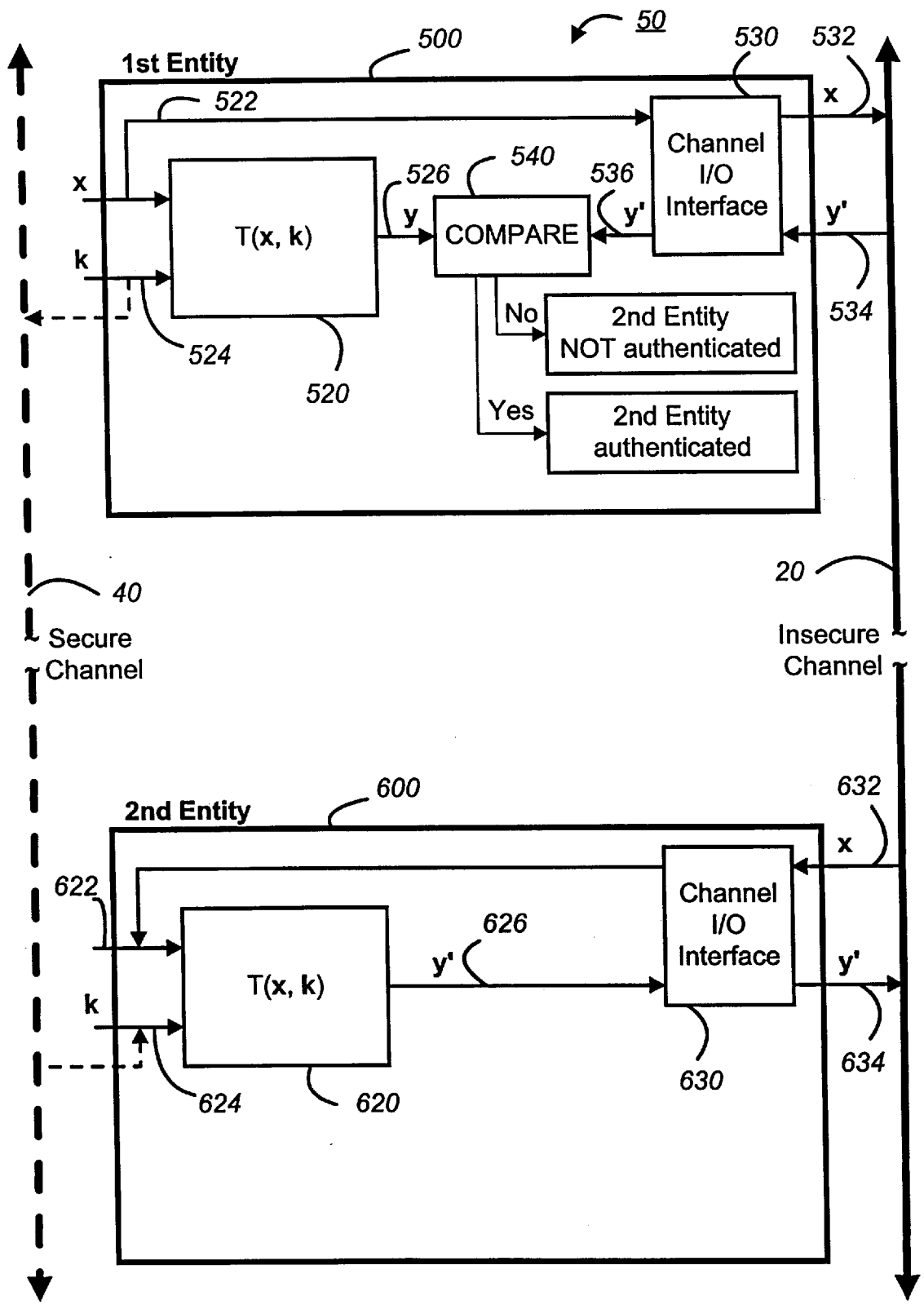
FIG. 4 illustrates schematically an authentication system comprising an authentication device of a first entity and a transponder of a second entity, according to a preferred embodiment of the present invention.

FIG. 4 illustrates schematically an authentication system, according to a preferred embodiment of the present invention. Generally, when a first entity is in communication with a second entity through an insecure channel, there is no assurance that the second entity is truly what it claims to be. The authentication system 50 is applicable to a first entity authenticating a second entity through an insecure channel 20.

The authentication system 50 comprises an authentication device 500 of a first entity and a transponder 600 of a second entity, both operating under the control of a shared key k. The authentication device 500 operates in two phases. In the query phase, it transmits a document x as a "query document" to the second entity. The transponder 600 of the second entity receives the query document x and responds with a signature document or authentication code that serves to identify the second entity. In the authentication phase, the authentication code returned by the second entity is checked by the authentication system of the first entity to determine if the second entity is authentic.

The authentication device 500 includes a mapping module 520 that has an input 522 for receiving the query document x to be encoded. The mapping module 520 is essentially that shown in FIG. 3. It also has another input 524 for receiving a key k. The encoding is performed by the mapping module 520 which effects a mapping $M_y(x, k)$. In the preferred embodiment the mapping $M_y$ is specified by k. Thus, given the key k, the mapping $M_y$ is known. The mapping $M_y(x, k)$ maps the query document x to an authentication code y which is therefore also k-dependent. The query document x is made available to the insecure channel or storage via a channel I/O interface 530 through an output lines 532. The k-dependent authentication code y is outputted from the mapping module 520 via an output 526.

In order for the transponder 600 to respond properly and prove that it is indeed what it claims itself to be, it must also be in possession of the key k that was used to encode x to y. This key k has previously been issued to the second entity by a key issuing authority under condition that the identity of the second entity was not in question. The second entity is then said to be have been certified and its issued key serves as an identity (ID) to properly identify it. That is if the second entity can prove that it has the certified key, its identity will be trusted. The certified key is generally unique to the second entity and is kept confidential and is shared only between the second entity and the key issuing authority, or any other entity deemed appropriate by the key issuing authority. In this case, the key is also known to the first entity who is required to authenticate the second entity via an insecure channel. Thus the authentication device 500 of the first entity and the transponder 600 of the second entity share the same key, namely the certified key of the second entity.

The transponder 600 retrieves the query document x from the insecure channel or storage 20 via a channel I/O interface 630 through an input line 632. The transponder 600 has a mapping module 620 similar to the mapping module 520 in the authentication device 500. The query document x is received into the mapping module 620 through input 622. The mapping module also has another input 624 for receiving the same key k that was employed by the first entity in the authentication device 500. Since the key k specifies the mapping $M_y$ to be performed by the mapping module 620, and if the same key k is employed in the authentication device 500 and the transponder 600, then the mapping performed in both devices will also be identical.

Thus, the mapping module 620 effects the mapping $M_y(x', k)$ that maps the query document x to a corresponding authentication code y'. This authentication code y' output from a line 626 serves as a response document or signature document of the second entity and is return to the first entity via the channel I/O interface 630 and an output line 634.

The authentication device 500 receives the returned authentication code y' through an input 534 to the channel I/O interface 530. A comparator 540 compares this authentication code y' from a line 536 with the authentication code y from the output 526 of the mapping module 520. If the two authentication codes are the same (i.e., y'=y), then the first entity can conclude that the correct y' is proof of the second entity in possession of its certified key. If the two authentication codes are found not to be the same, then it indicates that at least the keys or the authentication codes between the first and second entities are different. In this case, the second entity has not established itself as authentic.

Figure 5:
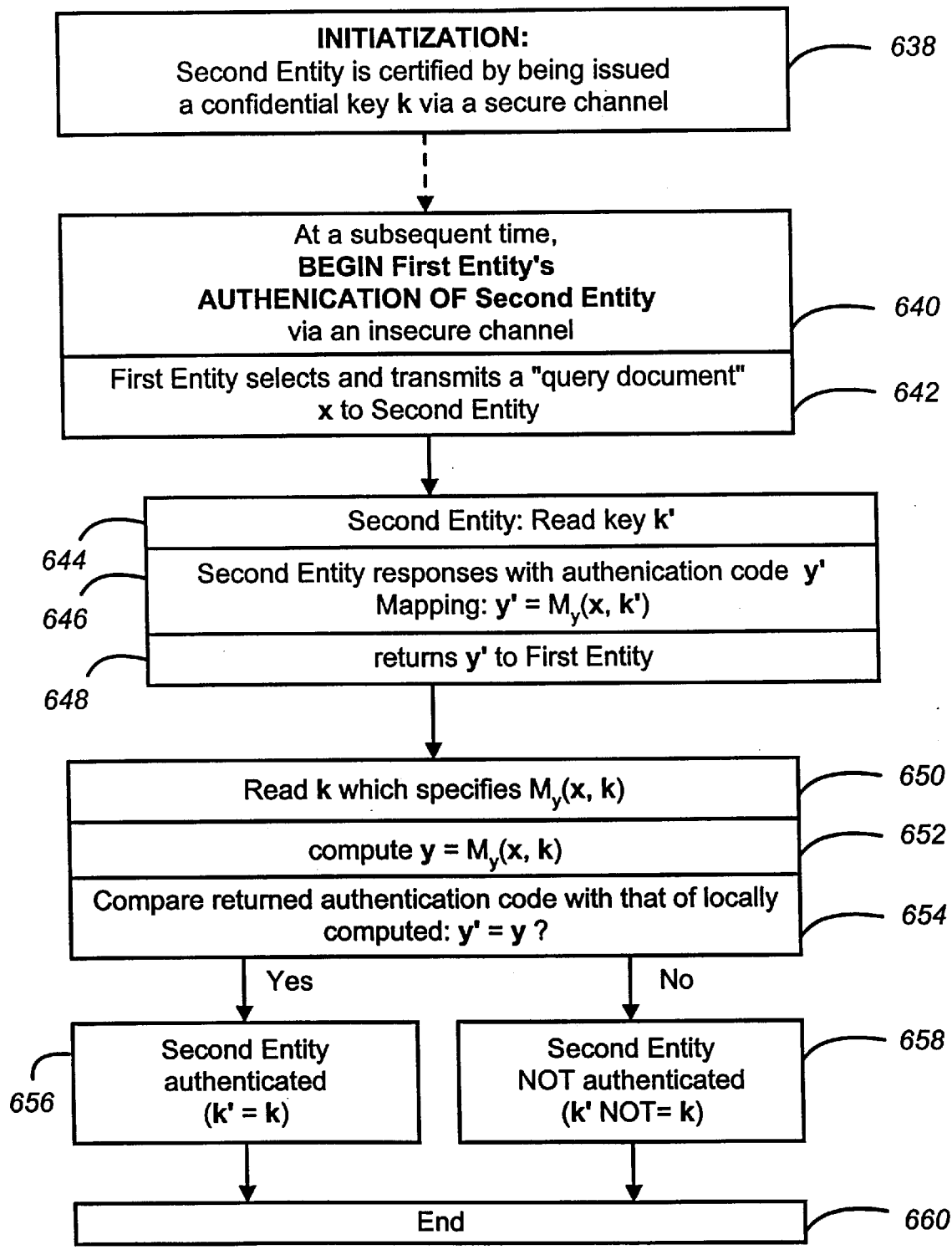
FIG. 5 is a flow diagram of the operation of the authentication system shown in FIG. 4.

FIG. 5 is a flow diagram of the operation of the authentication system shown in FIG. 4, which comprises the following steps:

Initial Certification
    STEP 638: The second entity has previously been certified by being issued a confidential key k via a secure channel.
First Entity Phase I
    STEP 640: Begin Source Data Encoding
    STEP 642: A query document x is selected and transmitted through a possibly insecure channel to the second entity.
Second Entity
    STEP 644: The key k is read into the mapping module 620 to specify the mapping $M_y(x, k)$.

STEP 646: The received query document x is mapped by the mapping $M_y(x, k)$ to the authentication code y'.

STEP 648: The authentication code y' is returned to the first entity via a possibly insecure channel.

First Entity Phase II

STEP 650: The key k is read into the mapping module 520 to specify the mapping $M_y(x, k)$.

STEP 652: The document x is mapped by the mapping $M_y(x, k)$ to the authentication code y.

STEP 654: The authentication codes y and y' are compared. If y=y', the operation proceeds to Step 352. If not, the operation proceeds to Step 354.

STEP 656: The result of the comparison indicates the second entity is authentic (since it must have the certifying key to specific the correct mapping.) The operation proceeds to Step 660.

STEP 658: The result of the comparison indicates the second entity is NOT authentic. The operation proceeds to Step 660.

STEP 660: End authentication.

In the embodiment illustrated by FIGS. 4 and 5, it can be seen that both the authentication device 500 and the transponder 600 produce an output that is dependent on two inputs, namely a document x and a key k. Both x and k are user-selectable, and as long as one of them is kept confidential, an outsider can not defeat the scheme and pretending to be the second entity. The key k is used to specify the mapping underlying the encoding in both the authentication device and the transponder. Whereas the document x could be an arbitrary document that is subjected to the encoding. The overall scheme is to keep the key k, shared between the first and second entities, confidential while the document x is transmitted via the insecure channel 20. Since the document x is user-selectable, the querying entity can change it at will to increase security. In one embodiment, it is made to vary every time a query is made.

Figure 6:
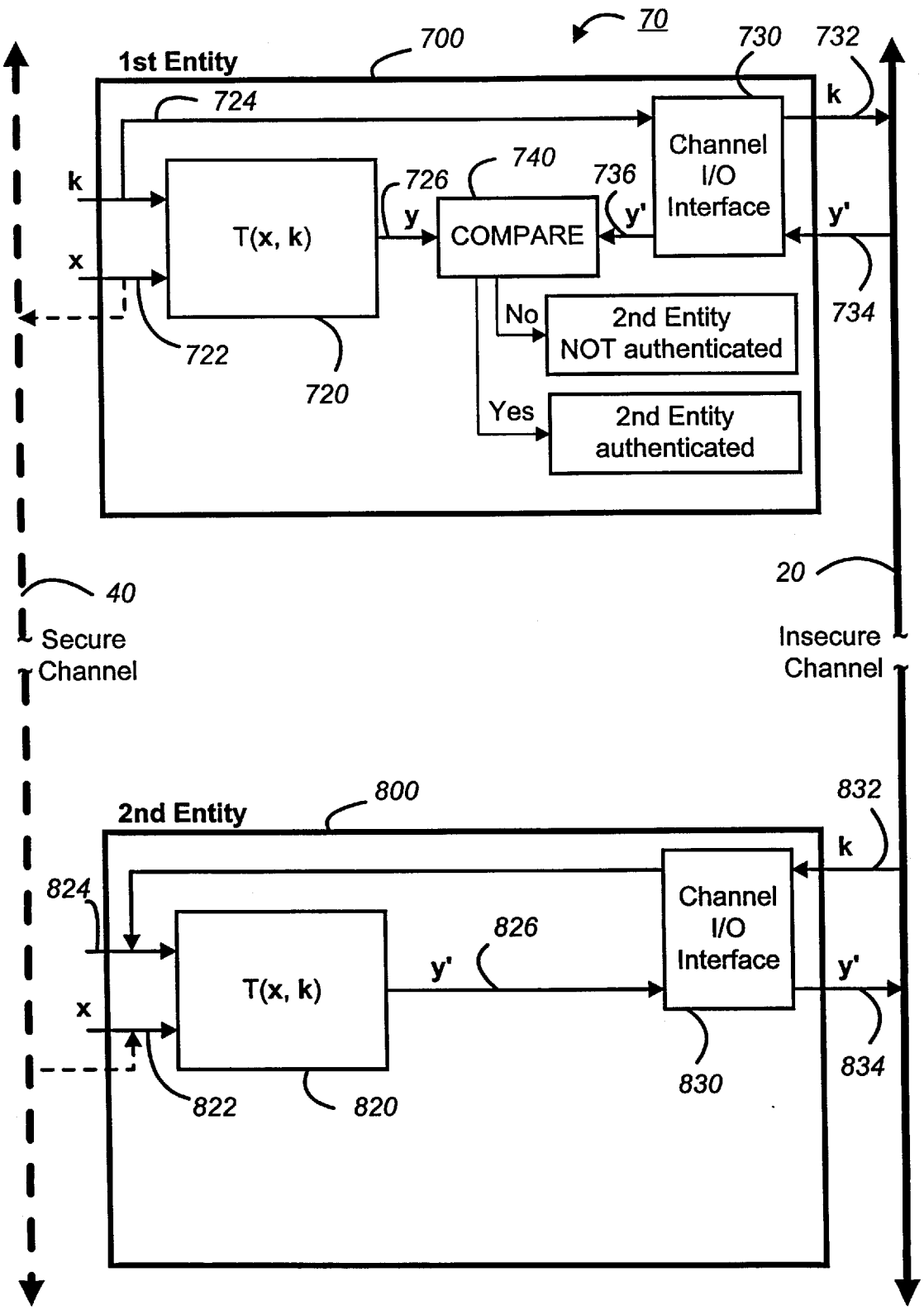
FIG. 6 illustrates schematically an authentication system, according to another preferred embodiment of the present invention.

FIG. 6 illustrates schematically an authentication system comprising an authentication device of a first entity and a transponder of a second entity, according to another preferred embodiment of the present invention. In this alternative embodiment, the document x is confidentially shared between the first and second entities, while the key k is transmitted via the insecure channel 20. The key k is not kept confidential and is used a query document.

The alternative authentication system 70 comprises an authentication device 700 of a first entity and a transponder 800 of a second entity, both operating under the control of a shared key k. The authentication device 70 operates in two phases. In the query phase, it transmits a query document which is the key k to the second entity. The transponder 800 of the second entity receives the query document and responds with a signature document or authentication code that serves to identify the second entity. In the authentication phase, the authentication code returned by the second entity is checked by the authentication system of the first entity to determine if the second entity is authentic.

The authentication device 700 includes a mapping module 720 that has an input 722 for receiving a query document k to be encoded. It also has another input 724 for receiving a confidential document x. The encoding is performed by the mapping module 720 which effects a mapping $M_y(x, k)$. In the preferred embodiment the mapping $M_y$ is specified by k. Thus, given the key k, the mapping $M_y$ is known. The mapping $M_y(x, k)$ maps the confidential document x to an authentication code y which is therefore also k-dependent. The query document k is made available to the insecure channel or storage via an I/O interface 730 through an output lines 732. The k-dependent authentication code y is outputted from the mapping module 720 via an output 726.

The transponder 800 retrieves the query document which is the key k from the insecure channel or storage 20 via a channel I/O interface 830 through an input line 832.

In order for the transponder 800 to respond properly and prove that it is indeed what it claims itself to be, it must also be in possession of the confidential document x that was used to encode x to y. This confidential document x has previously been issued to the second entity by a certifying authority under conditions that the identity of the second entity was not in question. The second entity is then said to be have been certified and its issued document x serves as an identity (ID) to properly identify it. That is if the second entity can prove that it has the certified document x, its identity will be trusted. The certified document x is generally unique to the second entity and is kept confidential and is shared only between the second entity and the certifying authority, or any other entity designated by the key issuing authority. In this case, the certified document is also known to the first entity who is required to authenticate the second entity via an insecure channel. Thus the authentication device 700 of the first entity and the transponder 800 of the second entity share the same document x, namely the certified document x of the second entity.

The transponder 800 has a mapping module 820 similar to the mapping module 720 in the authentication device 700. The query document k is received from the insecure channel 20 into the transponder via an input 832 into a channel I/O interface 830. It is further passed to the mapping module 820 through input 822. The mapping module also has another input 824 for receiving the same confidential certified document x that was employed by the first entity in the authentication device 700. Since the key k specifies the mapping $M_y$ to be performed by the mapping module 820, and the same key is employed in the authentication device 700 and the transponder 800, then the mapping performed in both devices will also be identical.

Thus, the mapping module 820 effects the mapping $M_y(x, k')$ that maps the query document k' to a corresponding authentication code y'. This authentication code y' serves as a response document or signature document of the second entity and is return to the first entity via the insecure channel 20 via the channel I/O interface 830 and an output line 834.

The authentication device 700 receives the returned authentication code y' from the insecure channel 20 through an input 734 to the channel I/O interface 730. A comparator 830 compares this authentication code y' from a line 832 with the authentication code y from the output 726 of the mapping module 720. If the two authentication codes are the same (i.e., y'=y), then the first entity can conclude that the correct y' is proof of the second entity in possession of its certified document. If the two authentication codes are found not to be the same, then it indicates that at least the certified documents or the authentication codes between the first and second entities are different. In this case, the second entity has not established itself as authentic.

Figure 7:
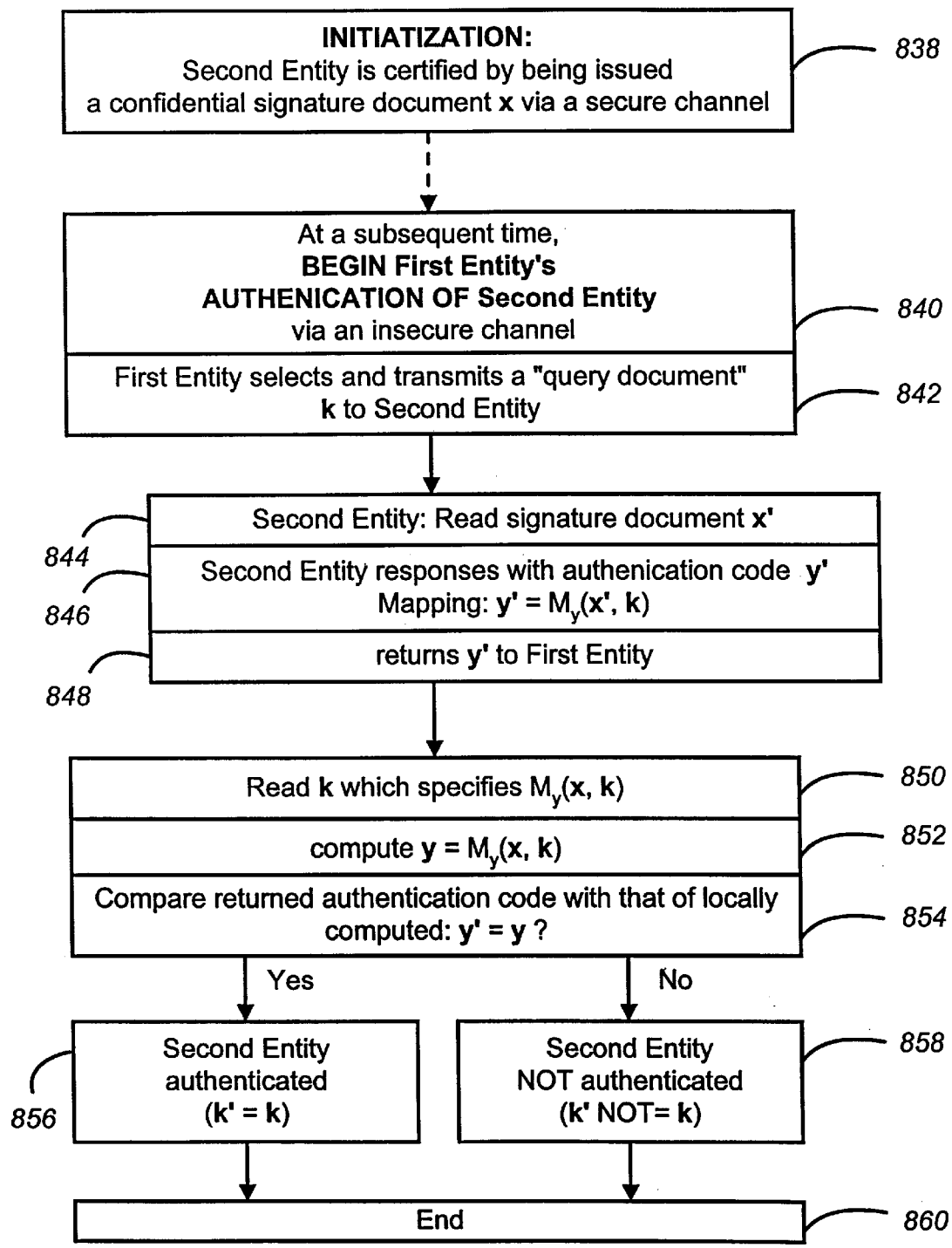
FIG. 7 is a flow diagram of the operation of the authentication system shown in FIG. 6.

FIG. 7 is a flow diagram of the operation of the authentication system shown in FIG. 6. The steps are similar to that shown in FIG. 5, except the role of x and k are reversed as far as the query document is concerned. Thus the authentication process comprises the following steps:

Initial Certification

STEP 838: The second entity has previously been certified by being issued a confidential signature document x via a secure channel.

First Entity Phase I
  STEP 840: Begin Source Data Encoding
  STEP 842: A query document in the form of a key k is selected and transmitted through a possibly insecure channel to the second entity.
Second Entity
  STEP 844: The key k is read into the mapping module 820 to specify the mapping $M_y(x, k)$.
  STEP 846: The confidential signature document x is mapped by the mapping $M_y(x, k)$ to the authentication code y'.
  STEP 848: The authentication code y' is returned to the first entity via a possibly insecure channel.
First Entity Phase II
  STEP 850: The key k is read into the mapping module 820 to specify the mapping $M_y(x, k)$.
  STEP 852: The confidential document x is mapped by the mapping $M_y(x, k)$ to the authentication code y.
  STEP 854: The authentication codes y and y' are compared. If y=y', the operation proceeds to Step 856. If not, the operation proceeds to Step 858.
  STEP 856: The result of the comparison indicates the second entity is authentic (since it must have the certifying signature document to obtain the correct mapping.) The operation proceeds to Step 860.
  STEP 858: The result of the comparison indicates the second entity is NOT authentic. Since the mapped result is incorrect, the confidential signature document x must be incorrect. The operation proceeds to Step 860.
  STEP 860: End authentication.

The fact that the mapping $M_1(x, k)$ is a function of both x and k, the trio (x, k, y) forms a definite relationship or constitutes a co-ordinate in a space spanned by them. In general, {y} is given by all possible combinations of {x} and {k}. In particular, there are two special cases where either k is constant or x is constant.

Thus, associated with the same document x, there can be a plurality of transformed document y such as $\{y_1, y_2, \ldots\}$ each dependent on a given key k such as $\{k_1, k_2, \ldots\}$. The various possible keys can therefore be assigned to different entities to serve as an identity for each entity.

Similar, associated with the same key k, there can be a plurality of transformed document y's each dependent on a given document x such as $\{x_1, x_2, \ldots\}$. The various possible documents can therefore be assigned to different entities to serve as an identity for each entity.

Figure 8:
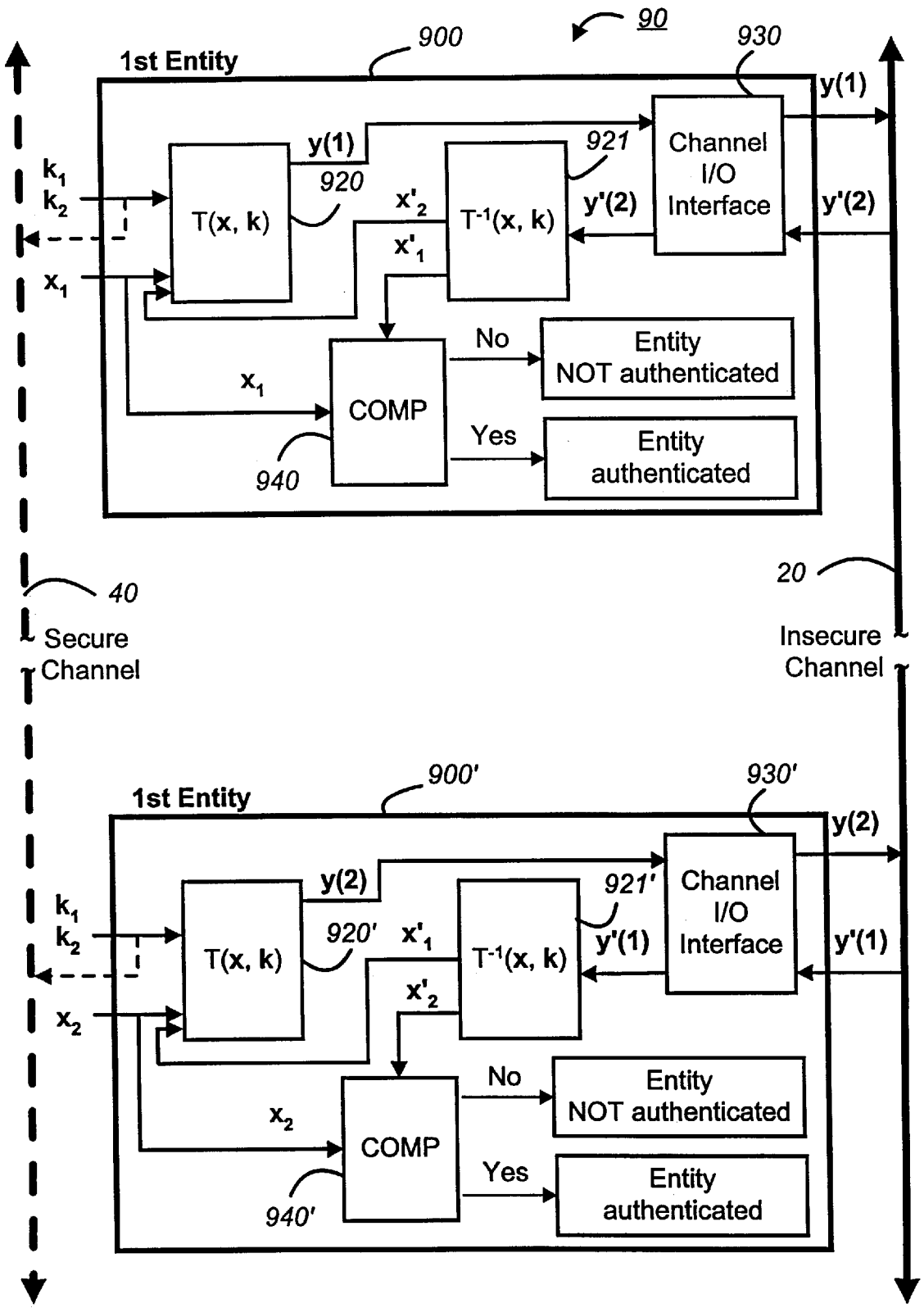
FIG. 8 illustrates an embodiment of an authentication system in which each entity can broadcast its own identity for others to authenticate and also to authenticate identities of others.

FIG. 8 illustrates another embodiment of an authentication system in which each entity can broadcast its own identity for others to authenticate and also to authenticate identities of others. The authentication system 90 is expediently illustrated with an authentication device 900 of a first entity and an authentication device 900' of a second entity, although generalization to multiple entities is trivial.

The authentication devices 900 and 900' are similar in that each encompasses both the authentication as well as the transponder functions described in connection with FIGS. 4 and 6. The first entity will be identified by a key $k_1$, while the second entity will be identified by a key $k_2$. Each entity must also have access to the other's key in order to authenticate the other entity. Thus both entity will have access to both $k_1$ and $k_2$.

In this case the authentication device 900 operates in two phases. In the query phase, a signature document $x_1$ is selected by the first entity and it is converted by a mapping module 920 into a transformed document $y(1)=y(x_1, k_1)$. This signature document is obtained by mapping $x_1$ to y as specified by $k_1$. The mapping module 920 is similar to the one shown in FIG. 3. The transformed document y(1) is then transmitted to the second entity as a "signature query document". It is sent via a channel I/O interface 930 and via an insecure channel 20.

The second entity receives the query document y(1) as y'(1) from the insecure channel 20 via a channel I/O interface 930'. The received transformed document y'(1) is then decoded by an inverse mapping module 921' to obtain the document $x_1'$. The inverse mapping effected by the inverse mapping module is specifiable by $k_1$. The document $x_1'$ is then re-encoded it as a transformed document $y(2)=y(x_1', k_2)$ or a "signature query document" by means of the mapping module 920'. This signature document is obtained by mapping $x_1'$ to y as specified by $k_2$. The transformed document y(2) is then returned to the first entity via the channel I/O interface 930' and the insecure channel 20.

In the authentication phase, the first entity receives the query document y(2) as y'(2) from the insecure channel 20 via a channel I/O interface 930. The received transformed document y'(2) is then decoded by an inverse mapping module 921 to recover the document $x_1'$. The inverse mapping effected by the inverse mapping module is specifiable by $k_2$. A comparator 940 compares the document $x_1'$ against the original $x_1$. If the recovered document is the same as the original one used by the first entity, then the second entity is determined to be authentic. Thus, the authentication goes through a first mapping under $k_1$, a second mapping under $k_1$, a third mapping under $k_2$ and a fourth mapping under k. This type of authentication in which more than one keys is applied to transform a document during the exchange between two entities can be regarded as a non-uniform authentication.

Similarly, if the second entity wishes to determine the authenticity of the first entity, it can select a document $x_2$ and transmit a signature query document $y(2)=y(x_2,k_2)$ and waits for the first entity to respond with $y'(1)=y(x_2,k_1)$, and so forth.

The underlying basis for this scheme is that a key k not only defines the mapping M, but also its inverse mapping $M^{-1}$. Thus, the encoding is the mapping from x to y and the decoding is the inverse mapping from y back to x. In particular for the example mapping $y_t=A\ x_t+z_t$, the inverse mapping will be $x_t=A^{-1}[y_t-z_t]$. Examples of such mappings are also disclosed in U.S. Pat. No. 5,539,827, relevant portions thereof are incorporated herein by reference.

It will be seen from the disclosure that various aspect of data security can be effected in a unified and economic fashion by a key-controlled mapping. The mapping is controlled by a key k and generally maps a document x to a transformed document y. In some embodiments, the mapping is reversible and the transformed document can be inversely mapped back to the original document. In other embodiments, the mapping maps the document x into a transformed and highly compressed document v. Such highly compressive mapping is usually irreversible, but has the advantage of lower storage or bandwidth requirement when stored or being transmitted. Various aspects of data security such as validation, authentication and encryption are accomplished by the aforementioned combinations of encoding and decoding employing the mapping, inverse mapping, the document x, the transformed document y and the highly compressed document v. It will be seen that a single mapping module such as that shown in FIG. 3 with the optionally addition of inverse mapping will be an expedient and economic implementation of a unified and comprehensive data security system.

While the embodiments of the various aspects of the present invention that have been described are the preferred implementations, those skilled in the art will understand that variation thereof may also be possible. Therefore, the invention is entitled to protection within the full scope of the appended claims.

It is claimed:

1. In a system for a first entity to authenticate a second entity, said second entity claiming to be one previously been certified by issuance of a security token thereto, the system comprising:

a mapping shared between said first and second entities, said mapping dependent on at least first and second variables;

an authentication device of said first entity;

a transponder device of said second entity, and wherein said authentication device of said first entity comprises:

means for receiving a certified copy of said security token;

means for deriving a specified value for the first variable of said mapping from said security token;

means for generating a specified value for the second variable of said mapping;

means for computing a first authentication code by evaluating said mapping at the respective specified value of the two variables;

means for transmitting the specified value for the second variable to said second entity; and wherein said transponder device of said second entity comprises:

means for receiving a copy of said security token;

means for deriving the specified value for the first variable of said mapping from said security token;

means for receiving the specified value for the second variable from said first entity;

means for computing a second authentication code by applying said mapping evaluated at the respective specified value of the two variables; and wherein said authentication device of said first entity further comprises:

means for receiving said second authentication code;

means for comparing said first and second authentication codes, thereby determining the authenticity of said second entity by whether or not the specified values of the first and second variables between said first and second entities are identical.

2. An authentication system as in claim 1, wherein:

the value of the first variable derivable from said security token is confidential; and the value of the second variable generated by said first entity is transmittable to said second entity via an insecure communication link.

3. An authentication system as in claim 2, wherein:

the value of the first variable derivable from said security token serves as a key that defines said mapping;

the value of the second variable generated by said first entity serves as an interrogation document; and the first and second authentication codes are individually obtainable by applying the respective defined mappings to the respective interrogation documents.

4. An authentication system as in claim 2, wherein:

the value of the first variable derivable from said security token serves as a document identifying the second entity;

the value of the second variable generated by said first entity specifies a key that defines said mapping; and the first and second authentication codes are individually obtainable by applying the respective defined mappings to the respective identifying documents.

5. An authentication system as in claim 3 or 4, wherein said mapping is of the type with a repertoire having a size that is selectable through said key.

6. A method for a first entity to authenticate a second entity, said second entity having previously been certified by issuance of a security token thereto, said method comprising:

sharing a mapping between said first and second entities, said mapping depending on at least first and second variables;

a first set of steps by said first entity comprising:

receiving a certified copy of said security token;

deriving a specified value for the first variable of said mapping from said security token;

generating a specified value for the second variable of said mapping;

computing a first authentication code by evaluating said mapping at the respective specified value of the two variables;

a second set of steps by said second entity comprising:

receiving a copy of said security token;

deriving the specified value for the first variable of said mapping from said security token;

receiving the specified value for the second variable from said first entity;

computing a second authentication code by applying said mapping evaluated at the respective specified value of the two variables; and a third set of steps by said first entity comprising:

receiving said second authentication code;

comparing said first and second authentication codes, thereby determining the authenticity of said second entity by whether or not the specified values of the first and second variables between said first and second entities are identical.

7. A method as in claim 6, wherein:

the value of the first variable derivable from said security token is confidential; and the value of the second variable generated by said first entity is transmittable to said second entity via an insecure communication link.

8. A method as in claim 7, wherein:

the value of the first variable derivable from said security token serves as a key that defines said mapping;

the value of the second variable generated by said first entity serves as an interrogation document; and the first and second authentication codes are individually obtainable by applying the respective defined mappings to the respective interrogation documents.

9. A method as in claim 7, wherein:

the value of the first variable derivable from said security token serves as a document identifying the second entity;

the value of the second variable generated by said first entity specifies a key that defines said mapping; and the first and second authentication codes are individually obtainable by applying the respective defined mappings to the respective identifying documents.

10. A method as in claim 8 or 9, wherein said mapping is of the type with a repertoire having a size that is selectable through said key.

* * * * *